(12) United States Patent
Cole

(10) Patent No.: US 6,532,679 B2
(45) Date of Patent: Mar. 18, 2003

(54) FIXTURE FOR A TABLE SAW

(76) Inventor: Jerry W. Cole, 8 Dolge Ct., Charlton, MA (US) 01501

(*) Notice: Subject to any disclaimer, the term of this patent is extended or adjusted under 35 U.S.C. 154(b) by 0 days.

(21) Appl. No.: 09/798,680

(22) Filed: Mar. 2, 2001

(65) Prior Publication Data

US 2002/0023365 A1 Feb. 28, 2002

Related U.S. Application Data

(62) Division of application No. 09/055,896, filed on Apr. 6, 1998, now Pat. No. 6,195,905, which is a division of application No. 08/459,747, filed on Jun. 2, 1995, now Pat. No. 5,735,054.

(51) Int. Cl.[7] ............................ B23Q 17/22; B27G 23/00
(52) U.S. Cl. .......................... 33/640; 33/471; 83/477.2; 83/522.16
(58) Field of Search .................................. 33/640, 471

(56) References Cited

U.S. PATENT DOCUMENTS

| 1,314,291 A | 8/1919 | Wallace | |
|---|---|---|---|
| 1,669,941 A | 5/1928 | Kennedy | |
| 2,106,288 A | 1/1938 | Tautz | |
| 2,685,824 A | * 8/1954 | Coop | 269/317 |
| 2,758,615 A | 8/1956 | Mastriforte | |
| 3,011,529 A | 12/1961 | Copp | |
| 3,124,178 A | 3/1964 | Packard | |
| 5,038,486 A | * 8/1991 | Ducate, Sr. | 33/430 |
| 5,040,444 A | 8/1991 | Shiotani et al. | |
| 5,058,284 A | * 10/1991 | Stevenson | 33/471 |
| 5,097,601 A | * 3/1992 | Pollak et al. | 33/469 |
| 5,207,007 A | 5/1993 | Cucinotta et al. | |
| 5,491,906 A | 2/1996 | Reilly | |
| 5,632,096 A | 5/1997 | Horvath | |
| 6,256,900 B1 | * 7/2001 | Myers | 33/471 |

* cited by examiner

*Primary Examiner*—Diego Gutierrez
*Assistant Examiner*—Yaritza Guadalupe
(74) *Attorney, Agent, or Firm*—Blodgett & Blodgett, P.C.

(57) ABSTRACT

A self-adjusting accessory for a table saw that includes a guide for sliding in the guide groove of the work supporting table of a table saw and which is biased against the edge of the guide groove which is closest to the cutting blade. The guide bar is used in conjunction with the plurality of table saw fixtures such as a miter gauge, an alignment gauge and a stop gauge. The alignment gauge also forms part of apparatus for carrying out a method of verifying the straightness of the arbor for the cutting blade, the alignment of the arbor relative to the guide groove of the work supporting table and the flatness of the cutting blade. The invention also includes an apparatus for adjusting the alignment of the arbor relative to the guide groove of the work supporting table.

9 Claims, 6 Drawing Sheets

FIXTURE FOR A TABLE SAW

CROSS-REFERENCE TO RELATED APPLICATIONS

This application claims the benefit under 35 U.S.C. §119 (e) of prior U.S. application Ser. No. 09/055,896, filed Apr. 6, 1998, now U.S. Pat. No. 6,195,905; which is a division of U.S. application Ser. No. 08/459,747, filed Jun. 2, 1995, now U.S. Pat. No. 5,735,054; which are hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention relates generally to a table saw fixture and particularly to a fixture and fixture combinations which provide accurate alignment to enable square cuts to be made on a workpiece. The invention also relates to a method of verifying the alignment of the arbor for the cutting blade, relative to the guide groove in the work supporting table of a table saw, as well as a method of and apparatus for adjusting the alignment of the arbor relative to the guide groove.

The modern table saw has a work supporting table which is provided with a slot and at least one guide groove in the upper surface of the table which is parallel with the slot. A circular cutting blade is mounted on an arbor which is rotatably mounted on a cradle which is connected to the table so that the blade extends through the slot in the table. The cradle is mounted on the table so that it can be raised or lowered and so that it can be rotated about a front to back horizontal axis. This enables the operator to adjust the amount of cutting height of the saw and the cutting angle of the saw, relative to the upper surface of the work supporting table.

The arbor supporting cradle in most modern table saws is pivotally mounted between a pair of trunnions. One trunnion is fastened to the bottom surface of the supporting table at the front end of the table saw. The other trunnion is fastened to the bottom surface of the supporting table at the rear end of the saw. The rear trunnion is fastened by bolts which extend through oversize holes in the rear trunnion. This enables the rear trunnion to be moved laterally a small amount, relative to the front trunnion, to correct for a possible misalignment of the arbor relative to the guide groove in the work supporting table. It is essential that the arbor be at a right angle to the guide groove so that the cutting blade is parallel with the guide groove of the supporting table. If the cutting blade is not parallel with the guide groove, the bolts which fasten the rear trunnion to the supporting table are loosened and the rear trunnion is forced into an adjusted position, for example by striking the trunnion with a hammer to move the rear trunnion laterally and to change the alignment of the cutting blade relative to the guide groove. This represents a crude and imprecise adjusting feature. It is extremely difficult to align the cutting blade relative to the guide groove with any degree of accuracy by the use of hammer blows. Also, even if an accurate alignment of the cutting blade is achieved, the achieved correct alignment can be lost when the bolts which hold the rear trunnion to the table are tightened.

The accurate cutting of a workpiece can be affected by factors other than the alignment of the cutting blade to the guide groove of the supporting table. These other factors include a cutting blade which may not be perfectly flat, an arbor which may not be perfectly straight and a guide groove which does not have a uniform width or is too wide for the guide bar of a fixture which is used for a cutting operation.

Verification devices have been developed for checking the alignment of the cutting blade with the guide groove of a table saw and for the flatness of the cutting blade. A typical verification device includes an elogated guide bar for slidable mouting in the guide slot of the work supporting table, a cross bar which is connected to the guide bar for supporting a gauge such as a feeler gauge which has a dial face, a dial and a plunger which is mounted of the gauge for axial movement relative to dial face and which is operatively connected to the dial. Although the gauge portion of the verification device is a very accurate instrument, inaccurate readings are obtained from the gauge due to a less than precise fit of the guide bar portion of the verification device within the guide groove and the lack uniformity in the width of the groove. One prior art specification device utilizes a split bar which can be adjusted to fit into the guide slot by screws which are threaded into the bar. However, the device must be readjusted for another application. Also, prior art verification device which employ a dial gauge are limited in the ways that they can be used, due to the manner in which the dial gauge is mounted on the cross bar.

Inaccurate cutting of a workpiece occurs even if the longitudinal axis of the arbor is properly aligned with the guide groove and the guide bar of the fixture, such as a miter gauge, fits perfectly in a perfectly uniform guide groove. Inaccurate cuttings can occur if the arbor is not straight or if the cutting blade is not flat. If the arbor is straight and the guide bar of the fixture fits perfectly in the guide groove of the table saw, a misalignment of the arbor relative to the guide groove or a warp in the cutting blade can be detected by existing verification devices. However, there is no effective way to determine the straightness of the arbor without removing the arbor from the table saw or of making a proper adjustment of the arbor if one or more other variables which affect alignment are present. If there are errors or flaws in two or more variables, it is very difficult to verify and isolate the flaws and to correct them.

Proper alignment of the cutting blade and fixtures is particularly critical when the table saw is used for cutting very thin strips from a workpiece, i.e. for cutting veneer strips. For such thin pieces, uniformity of thickness is critical. Cutting accuracy must be maintained with low tolerance for error. Also, there is a lower limit to the width of strip which can be cut on a table saw by using conventional equipment and methods. Still further, precise cuts are extremely difficult to obtain on a conventional table saw, using conventional fixtures. These and other difficulties experienced with the prior art table saws, table saw fixtures, and method of using the fixtures with table saws have been obviated by the present invention.

It is, therefore, a principal object of the invention to provide a verification apparatus for checking all variables in a conventional table saw which contribute to alignment errors between the cutting blade and guide groove in the work supporting table of the table saw.

Another object of the invention is the provision of a method of checking and measuring all variables in a conventional table saw which contribute to alignment errors between the cutting blade and the guide groove in the work supporting table of the table saw.

A further object of the invention is the provision of an apparatus for and a method of positively and precisely aligning the arbor of a table saw relative to the guide groove in the work supporting table of the table saw.

It is another object of the invention to provide a self-adjusting guide bar for sliding in the guide groove of a table saw for use with a plurality of saw fixtures and which maintains a constant and precise relationship between the fixture and the cutting blade of the table saw.

A still further object of the invention is the provision of an alignment gauge which has improved precision and versatility.

It is a further object of the invention to provide a locating gauge for use in a table saw to enable narrow pieces to be cut from a workpiece with improved accuracy and uniformity.

With these and other objects in view, as will be apparent to those skilled in the art, the invention resides in the combination of parts and steps set forth in the specification and covered by the claims appended hereto.

SUMMARY OF THE INVENTION

The present invention includes an accessory for a table saw which has a fixture which is connected to a self-adjusting guide mechanism for sliding in the guide groove in the upper surface of the work supporting table of a table saw. The guide mechanism includes an elongated bar for sliding in the guide groove and at least two spaced yieldable compensators which protrude from one vertical side surface of the bar for engaging one of the side surfaces of the guide groove of the supporting table to maintain the opposite vertical side surface at the bar snugly against the opposite side surface of the guide groove. More specifically, each compensator includes a horizontal bore in the guide bar, a plunger for extending beyond one of the vertical side surfaces of the bar, a stop for limiting the amount by which the compensators protrude beyond the side surface of the bar, and means for biasing the plunger against the stop. In one form of the invention, the fixture is a miter gauge. In a second form of the invention, the fixture is an alignment gauge. In a still further form of the invention, the fixture is a work locating gauge for cutting narrow strips from a workpiece. The present invention also includes a method of verifying the straightness of the arbor on which the cutting blade is mounted in the axial alignment of the arbor relative to the guide groove of the table saw. The straightness of the arbor in a table saw is preferably verified by applying a reference plate which has a flat reference surface and a bore which is transverse to the reference surface onto the arbor of a table saw so that the reference plate rests against the conventional cutting blade locating stop of the arbor and the reference surface of the reference plate faces the guide groove of the table saw. The straightness of the arbor can be checked by a saw blade which is not necessarily perfectly flat as long as the saw blade remains stationary. An alignment gauge is applied to the guide groove of the table saw. The alignment gauge has an elongated guide bar for sliding in the guide groove and a cross bar which supports a dial gauge and a feeler rod which is slidingly mounted relative to the dial gauge for movement toward and away from the reference surface of the reference plate. The alignment gauge is positioned so that the feeler rod engages the surface of a reference plate and the arbor is rotated to a plurality of angular positions relative to the reference plate while maintaining the reference plate in a fixed position so that gauge readings can be taken at each of the angular positions. The right angle alignment of the arbor can be verified by applying the reference plate to the arbor so the plate extends through the slot for the cutting blade in the work supporting table and above the upper surface of the table. The alignment gauge is applied to the saw so that the guide bar of the gauge is slidably mounted in the guide groove and the feeler rod of the dial gauge extends to the reference surface of the reference plate. The alignment gauge is positioned at a first point in the guide groove of the work supporting table so that the feeler rod engages a first point at the front of the reference surface of the reference plate to obtain a first gauge reading. The dial gauge is then positioned at a second point along the guide groove of the work supporting table saw so that the feeler rod engages a second point at the rear of the reference surface of the reference plate to obtain a second gauge reading. The first and second readings are compared to determine if the arbor is at a right angle to the guide groove. In addition to the reference plate, the apparatus for verifying the straightness of the arbor in a table saw also includes a cap which is fixed to the free end of the arbor and a compression spring for mounting on the arbor between the reference plate and the cap to bias the reference plate against the stop on the arbor. This enables the arbor to be rotated relative to the reference plate and stopped at periodic increments of rotation so that a gauge reading can be taken each time that the arbor stopped.

The present invention also includes a method of and an apparatus for changing the alignment of the arbor if it is determined by the verification apparatus and method that the arbor of the present invention is not at a right angle to the guide groove of the supporting table. The alignment apparatus and method of the present invention are applicable to table saws in which the arbor is supported for rotation on a cradle which is, in turn, pivotally mounted between a pair of trunnions wherein each trunnion has a pair of flanges which enable the trunnion to be connected to the work supporting table by a pair of bolts. Each flange has a vertical aperture which is vertically aligned with a threaded vertical aperture in the work supporting table. The alignment apparatus of the present invention includes a pair of L-shaped brackets having a vertical leg and a horizontal leg. The vertical leg has a threaded aperture for receiving an adjusting screw. The horizontal leg has a vertical hole for receiving a bolt. Realignment of the arbor is accomplished by removing the bolts, one at a time, which connect one of the trunnions to the work supporting table of the table saw and positioning the brackets at opposite sides of the trunnion so that the horizontal leg portions of the brackets are below the flanges of the trunnion and the hole in the horizontal leg of each bracket is vertically aligned with the aperture in the flange with which the horizontal leg is engaged. A bolt is extended through the hole in the horizontal leg portion of each bracket and the aperture of the corresponding flange of the trunnion. The bolts are threaded into the threaded apertures in the table to support the L-shaped brackets and the trunnion but not tightened so that the trunnion is loosely connected to the supporting table and the trunnion is free to be moved laterally a slight amount. The trunnion is moved laterally to change the alignment of the arbor by rotating one of the adjusting screws until it engages the end edge of the flange. Additional rotation of the adjusting screw causes the trunnion to move laterally toward the other L-shaped bracket until the arbor is at a right angle to the guide groove of the table saw as verified by the verification apparatus of the present invention. The other adjusting screw is then advanced until it touches the edge of the opposite flange of the trunnion so that the trunnion is essentially locked in its correct position with respect to the right angle alignment of the arbor with the guide groove of the work supporting table. Each adjusting screw is provided with a lock nut to make sure that the trunnion remains in the correct set position. The trunnion bolts can then be tightened to secure the trunnion in the correct adjusted position.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
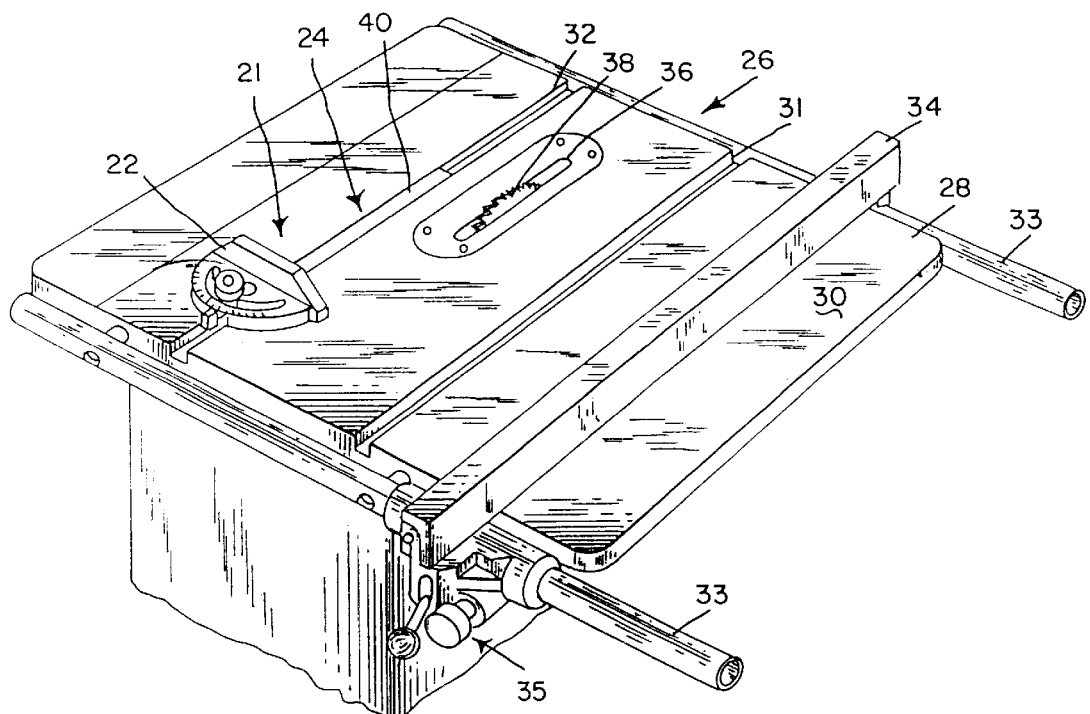
FIG. 1 is a perspective view of a miter gauge embodying the self-adjusting accessory principle of the present invention and shown applied to the supporting table of a conventional table saw.
Figure 2:
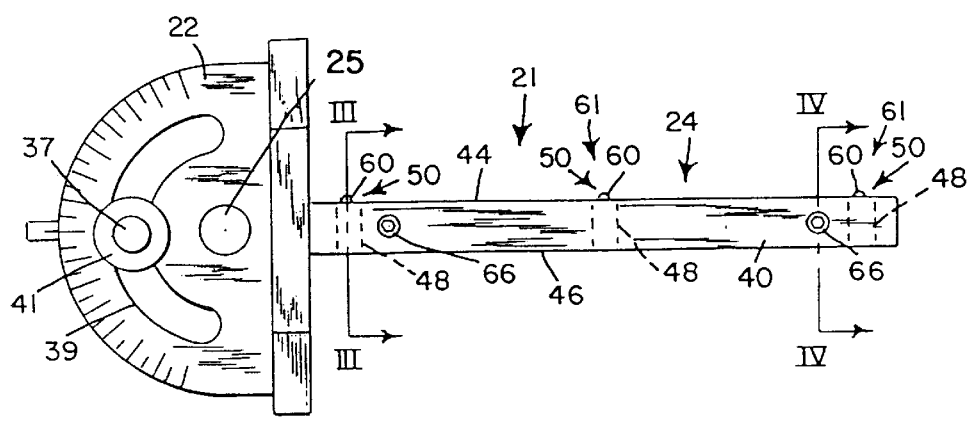
FIG. 2 is a top plan view of the miter gauge.

Referring first to FIGS. 1–4 there is shown a self-adjusting accessory which is generally indicated by the reference numeral 21 and shown applied to the supporting table of a conventional table saw which is generally indicated by the reference numeral 26. The table saw 26 includes a workpiece supporting table which has an upper surface 30 which contains a pair of guide grooves 31 and 32. The table saw 26 also includes a ripping fence 34 which rests on the surface 30 and which is slidably mounted on a pair of guide rails 33. The ripping fence 34 can be locked in any desired position on the supporting surface 30 by a locking mechanism, generally indicated by the reference numeral 35.

The self-adjusting accessory 21 includes a miter gauge 22 which is pivotally connected to a guide mechanism, generally indicated by the reference numeral 24, by means of a pivot pin 25. The guide mechanism 24 includes an elongated bar 40 which contains a plurality of horizontal threaded bores 48. Each of the bores 48 contains a moveable plunger which is generally indicated by the reference numeral 50. A screw 37 is fixed to one end of the bar 40 and extends upwardly through an arcuate slot 39 in the miter gauge 22. A locking nut 41 is threaded to the upper end of the screw 37 for locking the miter gauge 22 to the bar 40 in any desired angle of position of the bar 40, relative to the miter gauge.

Figure 3:
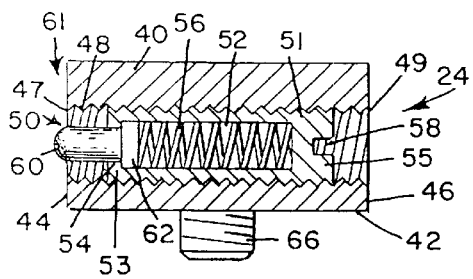
FIG. 3 is a vertical cross-sectional view of the miter gauge, taken along the line III—III of FIG. 2 and looking in the direction of the arrows.

Referring particularly to FIG. 3, each horizontal bore 48 has a first opening 47 in a first vertical side surface 44, and a second opening 49 in the second vertical side surface 46. The bore 48 has internal threads which correspond to the external threads of a plug 51 which is threaded into the bore 48 as shown in FIG. 3. The plug 51 has a chamber 52, a first end wall 53 which is adjacent the opening 47, and a second end wall 55 which is adjacent the opening 49. The end wall 55 has a groove 58 for receiving the blade of a screwdriver for rotating the plug 51 to selectively advance the plug 51 toward the opening 47 or to retract the plug 51 toward the opening 49. The first end wall 53 has an opening 54 into the chamber 52. The plunger 50 has a relatively wide portion 62 which is slidably mounted within the chamber 52 and a relatively narrow portion 60 which extends through the opening 54 in the wall 53 and through the opening 47 in the first vertical side surface 44. A compression spring 56 is located within the chamber 52 for biasing the relatively wide portion 62 of the plunger against the first end wall 53 so that the free end of the relatively narrow portion 60 of the plunger extends to an outer position beyond the first vertical side surface 44. The plunger 50 is movable axially against the bias of the spring 56 to an inner position wherein the outer end of the relatively narrow portion 60 of the plunger is at least flush with the first vertical side surface 44. The plug 51 functions as an adjustable stop mechanism for limiting the outward extension of the free end of the plunger to determine the outer position of the free end of the plunger. The outer position of the free end of the plunger can be changed by rotating the plug 51 within the bore 48. The plug 51, plunger 50 and spring 56 constitute a yieldable compensator, generally indicated by the reference numeral 61.

The miter gauge 22 is positioned on the work supporting table of the table saw, as shown in FIG. 1, so that the guide bar 40 is slidably mounted within the guide groove 32. The free ends of the plunger 50 bear against the vertical side surface of the groove which is furthest from and faces the cutting blade. The plungers 50 bias the second vertical side surface of the guide bar 40 against the vertical side surface of the groove 32 which is closest to and faces away from the cutting blade 38. This insures that the vertical side surface 46 will always be flush with the vertical side surface of the groove which faces away from the cutting blade 38 and which is closest to the cutting blade 38, regardless of how well the guide bar 40 fits within the groove 32 or whether or not the guide groove 32 is uniform in width. If the operator prefers to use the groove 31 on the opposite side of the cutting blade 38, the plugs 51 are removed from the bores 48 and reinserted into the bores through the openings 47 so that the narrow portions 60 of the plungers extend through the openings 49. In this orientation, the first vertical side surface 44 is biased flush against the vertical side surface of the groove 31 which faces away from and is closest to the cutting blade 38.

Figure 4:
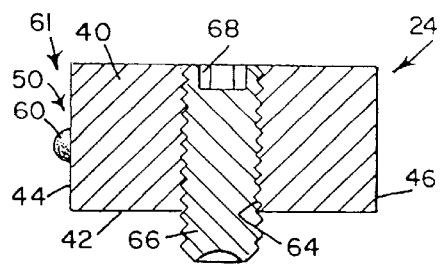
FIG. 4 is a vertical cross-sectional view of the miter gauge, taken along the line IV–IV of FIG. 2 and looking in the direction of the arrows.

Referring particularly to FIG. 4, the guide bar 40 has a pair of vertical threaded bores 64. An adjusting screw 66 is threaded into each bore 64 from the top so that the lower end of the screw extends below the bottom surface 42 of the guide bar 40. The upper end of the screw 66 has a hex socket 68 for receiving an alien wrench for adjusting the vertical position of the adjusting screw 66. The adjusting screw 66 provides a vertical adjustment feature for the guide bar 40 to adapt the guide bar to the depth of the guide groove in the work supporting table of the table saw. Guide groove depths vary considerably between different makes of table saws. The height of the guide bar 40 is adjusted so that the top of the guide bar is flush with the top surface of the work supporting table and the fixture to which it is attached such as the miter gauge 22 is flush with the upper surface of the work supporting table. The primary purpose of the adjusting screws 66 is to prevent the guide bar 40 from rocking within the guide groove.

Figure 5:
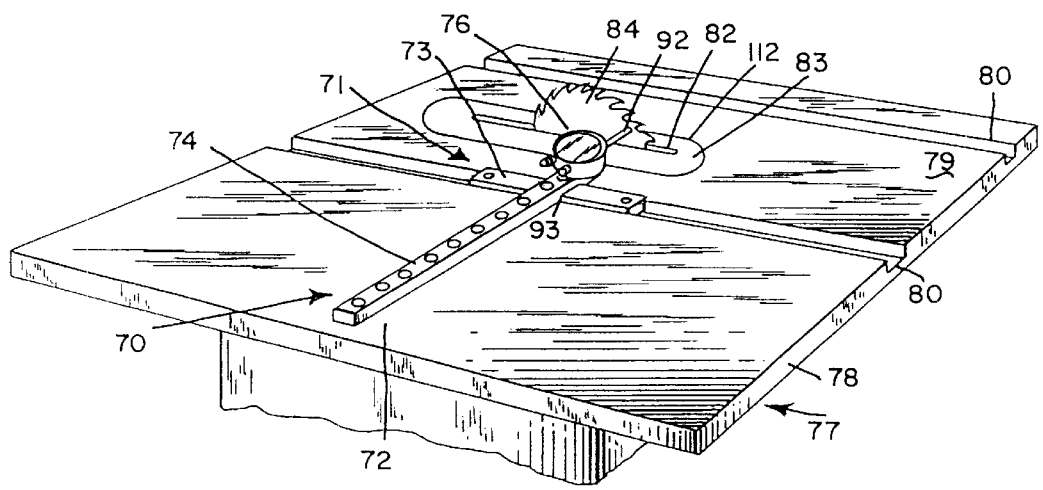
FIG. 5 is a perspective view of an alignment gauge embodying the self-adjusting accessory principle of the present invention and shown applied to the supporting table of a conventional table saw.
Figure 6:
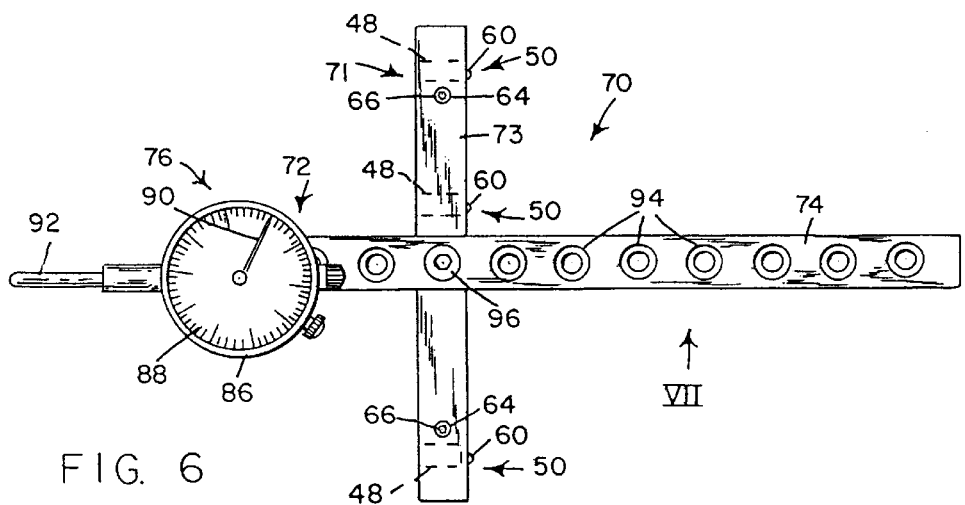
FIG. 6 is a top plan view of the alignment gauge.
Figure 7:
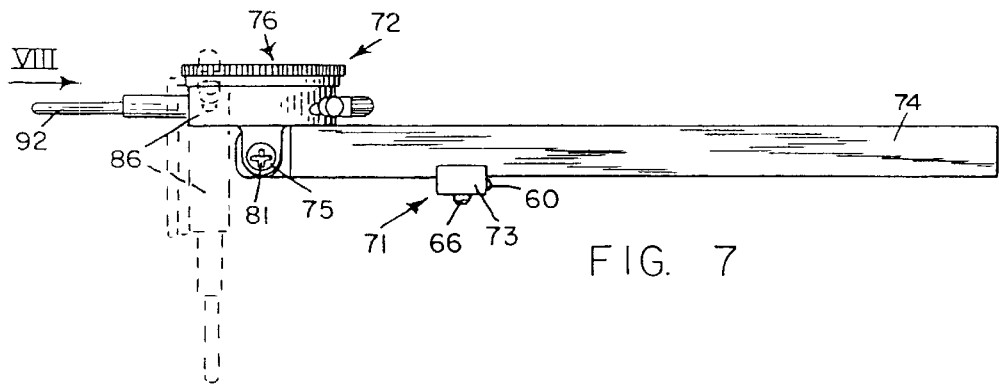
FIG. 7 is a side elevational view of the alignment gauge, looking in the direction of arrow VII of FIG. 6.
Figure 8:
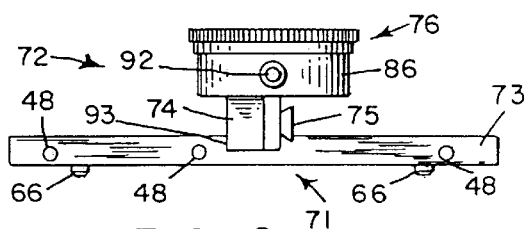
FIG. 8 is an end view of the alignment gauge, looking in the direction of arrow 8 of FIG. 7.

Referring to FIGS. 5–8, there is shown a self-adjusting accessory for a table saw which is generally indicated by the reference numeral 70. The fixture of the accessory 70 is an alignment gauge which is generally indicated by the reference numeral 72. The alignment gauge 72 includes a dial gauge, generally indicated by the reference numeral 76, which is pivotally mounted on a horizontal cross bar 74 for pivoting movement about a horizontal axis by means of a pivot pin 75. The cross bar 74 is connected to a guide mechanism 71 which includes an elongated guide bar 73 that extends transversely of the cross bar 74 as shown in FIG. 6. The guide bar 73 is similar to the guide bar 24 which was described previously. The guide bar 73 contains a plurality of threaded bores 48 which contain the plungers 50 and plugs 51 which are illustrated in FIG. 3. The elongated guide bar 73 also includes a plurality of vertical bores 64, each of which contains one adjusting screw 66 which is shown in FIG. 4 for vertically adjusting the guide bars 73 within the guide groove of the work supporting table of the table saw. The bar 73 differs from the bar 24 in that it has a threaded vertical aperture at a midpoint of the bar for receiving a screw 96 for connecting the cross bar 74 to the guide bar 73. The upper surface of the guide bar 73 has a horizontal slot 93 for receiving the lower end of the cross bar 74 to maintain the guide bar 73 at a right angle to the cross bar 74. The cross bar 74 has a plurality of vertical apertures 94. The screw 96 extends freely through any one of the apertures 94 and is threaded into the threaded aperture in the middle of the bar 73 to enable the cross bar 74 to be mounted on the guide bar 73 at a plurality of positions along the length of the cross bar 74. This enables the accessory 70 to be used with different makes of table saws which vary in the location of the guide groove 80 relative to the cutting blade of the table saw. The screws 66 are adjusted so that the guide bar extends above the surface of the work supporting table and the bottom surface of the cross bar 74 is flush with the top surface of the work supporting table. The dial gauge is a commercially available gauge such as a model number 605-4070 manufactured by Enco Company. The dial gauge 76 includes a circular housing 86, a dial face 88, a dial 90, and an elongated feeler rod 92 which is slidably mounted into the housing for movement longitudinally of the cross bar 74. The feeler rod 92 has a free end which extends beyond the end of the housing 86 and the cross bar 74.

The accessory 70 has multiple functions, including that of an alignment gauge for verifying the alignment of the cutting blade of a table saw relative to the guide groove in the work supporting table of the table saw or for verifying the flatness of the cutting blade. Referring to FIG. 5, the accessory 70 is employed as an alignment gauge by positioning the guide bar 73 within the guide groove 80 of the upper surface 79 of a work supporting table 78 which forms part of a table saw, generally indicated by the reference numeral 77. The work supporting table 78 of the table saw 77 also includes a vertical slot 82 through which a cutting blade 84 extends. The guide bar 73 is located in the groove 80 so that the free end of the elongated feeler rod 92 engages the face of the cutter blade 84 at a first point to obtain a first reading of the dial 90. The guide bar 73 is then moved longitudinally along the guide groove 80 so that the free end of the feeler rod 92 engages a second point on the cutting blade 84 to obtain a second reading of the dial 90. The second reading of the dial 90 is then compared with the first reading for verification of the alignment or flatness of the cutting blade 84, relative to the guide groove 80. The plungers 50 maintain the vertical side surface of the guide bar 73 which is closest to the cutting blade 84 flush against the vertical side surface of the guide groove 80 which is also closest to the cutting blade 84. This eliminates any errors in reading of the dial gauge which could be attributed to variations in the guide groove 80. The pivotal mounting of the alignment gauge 72 enables the dial gauge to be rotated about the pivot pin 75 to a plurality of positions between the horizontal full line position shown in FIG. 7 to the dotted line vertical position shown in FIG. 7. The pivot pin 75 is threaded into the cross bar 74 and is provided with a socket 81 for receiving a corresponding tool for rotating the pin 75 for loosening or tightening the pin 75. This enables the gauge 72 to be adjusted relative to the cross bar 74 so that the free end of the feeler rod 92 engages the face of the cutting blade 84 at a point very close to the top surface 79 of the work supporting table 78. This enables readings to be taken at two separate points on the face of the cutting blade 84 which are considerably further apart than would be possible along a horizontal line which is spaced substantially above the top surface 79 of the work supporting table. This provides a more accurate reading since any variation in the alignment of the cutting blade relative to the guide groove of the work supporting table is more likely to be detected when taking measurements at two widely separated points as compared to taking measurements at two points which are closer together.

The accessory 70 of the present invention can also be utilized for measuring the right angle alignment of the arbor of a drill press relative to the work supporting table of the drill press. This is accomplished by positioning the cross bar 64 beneath the chuck of a drill press so that one of the apertures 94 is aligned with the aperture of the chuck and inserting a pin through the aperture of the cross bar and into the chuck opening. The chuck is tightened to secure the bolt. The dial gauge 76 is repositioned to the dotted line position shown in FIG. 7. The chuck of the drill press is then lowered so that the free end of the feeler rod 92 touches the top surface of the work supporting table of the drill press to obtain a first reading. The cross bar 74 is then rotated about the bolt which supports the cross bar and the chuck so that the free end of the feeler rod 92 engages a second point on a work supporting table of the drill press to obtain a second reading. A comparison of the two readings of the gauge 76 verifies if the chuck is at a right angle to the work supporting surface of the drill press.

Figure 9:
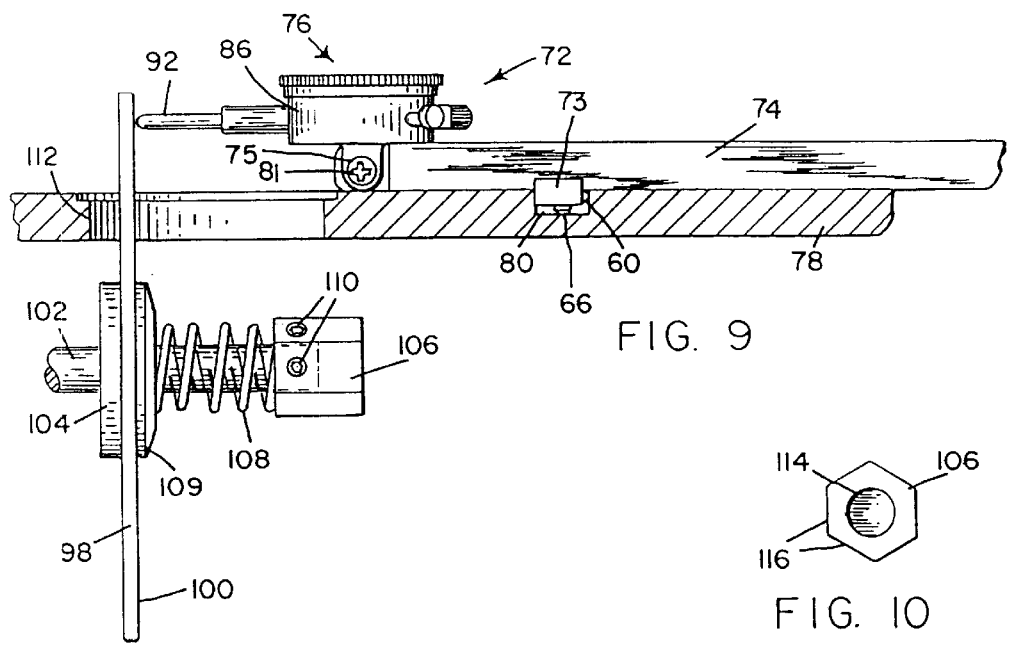
FIG. 9 is a side elevation view of apparatus which is used for verifying the straightness of the arbor of the table saw which includes the alignment gauge of FIGS. 6–8.
Figure 10:
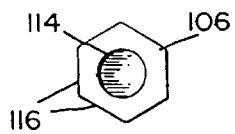
FIG. 10 is an end view the cap portion of the apparatus for verifying the arbor straightness.
Figure 11:
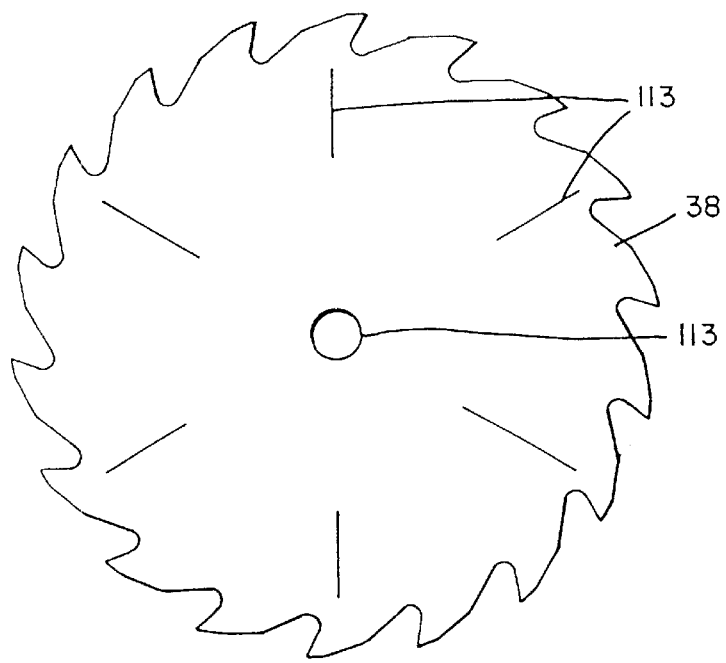
FIG. 11 is a face view of a cutting blade for a table saw.
Figure 12:
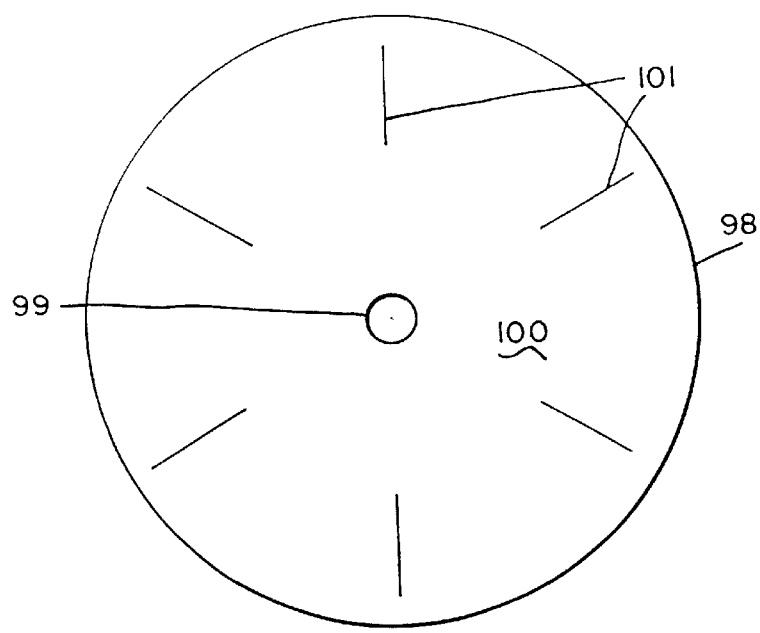
FIG. 12 is a face view of the reference surface of a reference plate which forms part of the verification apparatus of FIG. 9.

Referring to FIGS. 9–12, the alignment gauge accessory 70 is utilized in conjunction with other elements for carrying out a method of checking for all variables which contribute to errors in the alignment of the cutting blade relative to the guide groove of the table saw and for verifying the alignment of the cutting blade. The additional elements of the apparatus for alignment verification include a reference plate 98 which has a flat reference surface 100 and a central aperture 99. The surface 100 has a plurality of radial reference lines 101 which are evenly spaced at a predetermined number of degrees, as for example, every 60° as shown in FIG. 12. The plate 98 is adapted to be fixed onto the arbor 102 of the table saw and rests against the stop 104. The verification apparatus also includes a cap 106 which has a cylindrical socket 114 for receiving the free end of the arbor 102 as shown in FIG. 9. The cap 106 is fixed to the free end of the arbor 102 by means of set screws 110. A compression spring 108 is adapted to be mounted on the arbor 102 between the reference plate 98 and the cap 106 and, preferably, bears against a washer 109 which is located between the reference plate 98 and the spring 108. The side surface of the cap 106 is provided with a plurality of facets 116. In the example shown in FIGS. 9 and 10, the side surface of the cap 106 has six evenly spaced facets 116 and has the general appearance of a hex nut.

The procedure for verifying the alignment of the cutting blade of the table saw relative to the guide groove of the table saw begins by first removing a plate 83 which contains the slot 82 for the cutting blade to expose the larger slot 112 in the work supporting table 78 of the table saw.

The first procedure to be completed is the verification of the straightness of the arbor 102. This is accomplished by removing the cutting blade 38 and applying the reference plate 98 onto the arbor 102 so that it rests against the stop 104. The alignment guide 72 is then positioned on the work supporting table so that the cross bar 72 is located within the guide groove 80 and the elongated rod 92 engages the reference surface 100 of the reference plate. The basic method for verifying the straightness of the arbor 102 comprises maintaining the reference plate 98 stationery while rotating the arbor 102 for one complete revolution while pausing at regular angular increments to record readings from the dial gauge 76. Since the surface 100 is perfectly flat, the readings from the gauge 76 will be the same for all angular positions of the arbor 102 if the arbor is straight. A reference plate which has a reference surface which is not perfectly flat can also be used, as long as the reference plate is maintained in a stationary position. If the arbor 102 is crooked, the reading from the gauge 76 will be different. This procedure is facilitated by applying the washer 109 against the surface 100 of the reference plate 98 and applying the compression spring 108 onto the free end of the arbor 102. The cap 106 is then applied to the free end of the arbor 102 so that it compresses the spring 108. The cap 106 is fixed to the arbor by set screws 110. This provides a biasing force against the reference plate 98. The cap 106 provides a means for rotating the arbor 102 and the facets 116 serve as reference points to assist the operator in taking gauge readings at regular segments of rotation of the arbor 102. In the example shown FIGS. 9 and 10 the hexagonal shape of the cap 106 serves as a guide for six readings at 60° intervals.

When it is determined that the arbor 102 is straight, the next procedure is to verify the alignment of the arbor 102 relative to the guide groove 80 of the work supporting table 78. This is accomplished by applying the reference plate 98 and the washer 109 onto the arbor 102 so that the reference plate rest against the stop 104 and the washer 109 rest against the reference plate 98. The reference plate 98 is fixed to the arbor 102 by applying the same nut which is normally used to secure the cutting blade to the arbor so that it bears against the washer 109. The alignment gauge 76 is applied to the work supporting table as described above for checking the straightness of the arbor. A reading is taken at the front end of the reference plate and a reading is taken at the rear end of the reference plate. If the arbor 102 is at a right angle to the guide groove 80 within a vertical plane, the front and rear readings from the gauge 76 will be the same. If the arbor 102 is not at a right angle to the guide groove 80, the readings on the gauge 76 will differ, thereby indicating a misalignment of the arbor 102 relative to the guide groove of the work supporting table.

If it is determined, by using the procedures described above, that the arbor 102 is straight and that it is at a right angle alignment with the guide groove 80 of the work supporting table, the last procedure is to verify the flatness of the cutting blade 38 which is being used on the table saw. This verification procedure is accomplished by mounting the cutting blade 38 to the arbor 102 in the same manner as the mounting of the reference plate 100 as shown in FIG. 9. The arbor 102 is then raised so that the cutting blade extends above the top surface 79 of the work supporting table to a maximum degree. The flatness of the cutting blade 38 is verified by drawing a plurality of radial lines 113 on the flat surface of the cutting blade which faces the guide groove 80. The radial lines 113 are spaced at even angular increments, for example at 60° intervals. The arbor 102 is maintained stationary and the cutting blade 38 is rotated for one revolution while pausing at every 60° of rotation, as guided by the reference lines 113, to take a reading from the dial gauge 76. If the cutting blade 38 is perfectly flat, all of the gauge readings will be the same. If the cutting blade 38 is warped, then the readings from the gauge 76 will be different. Once it has been determined that the arbor is straight and the cutting blade is flat, the alignment of the arbor 102 can be verified with the use of the alignment gauge 72. The dial gauge 76 is pivoted relative to the cross bar 74 so that the free end of the elongated rod 92 touches the face of the cutting blade 38 just above the upper surface 79 of the work supporting table 78. A first reading is taking at a first point on the cutting blade. The accessory 70 is then moved along the guide groove 80 so that a second reading can be taken at a second point the opposite end of the exposed portion of the cutting blade.

Figure 13:
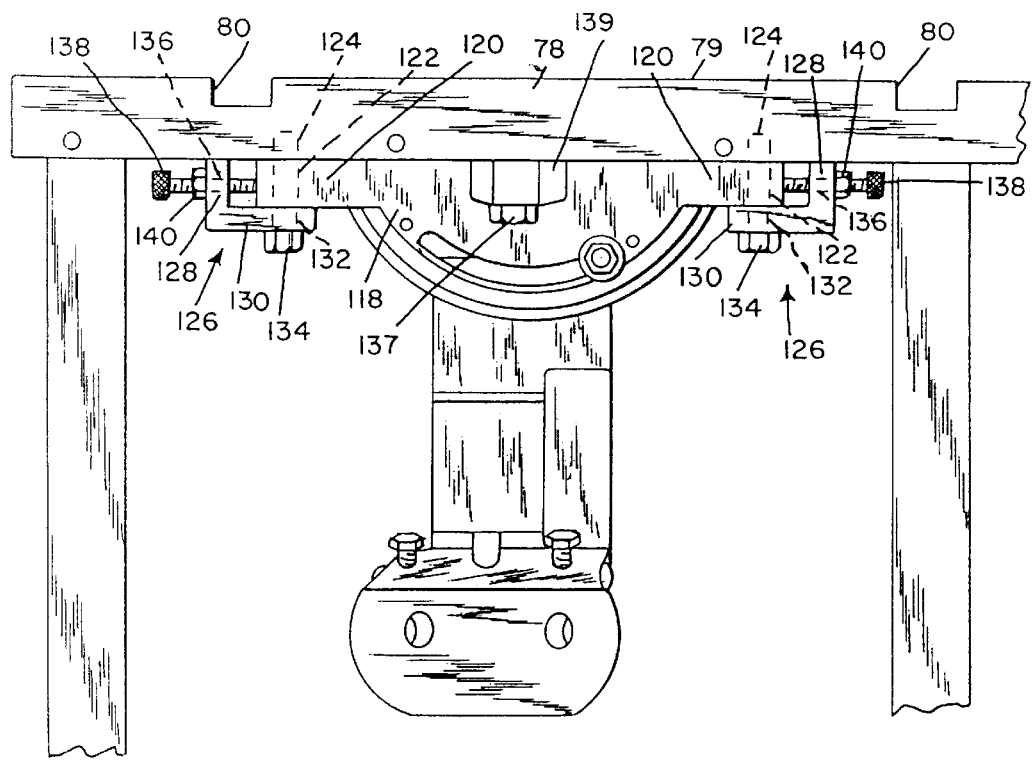
FIG. 13 is a rear elevation view of apparatus for aligning the arbor of a table saw relative to the guide groove in the supporting table of the table saw and shown applied to the back arbor supporting trunnion of the table saw.
Figure 14:
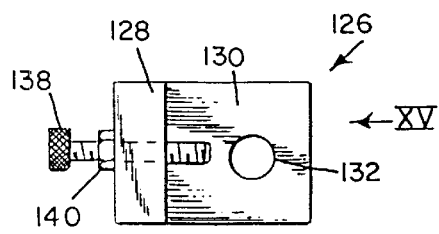
FIG. 14 is a top plan view of the arbor aligning apparatus of FIG. 13.
Figure 15:
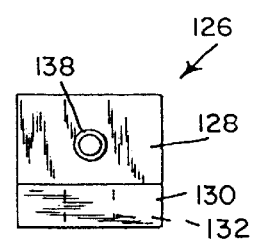
FIG. 15 is an end view of the arbor aligning apparatus, looking in the direction of arrow XV of FIG. 14.

When it is discovered that the arbor 102 is misaligned relative to the guide groove 80 during an initial series of verification tests or at a subsequent time during use of a table saw, the arbor 102 is readjusted into a proper right angle alignment relative to the guide groove by the apparatus which is shown in FIGS. 13–15. The mechanism for aligning the arbor of the table saw comprise a pair of L-shaped brackets, generally indicated by the reference numeral 126, for use with a table saw in which the arbor is supported on a cradle which is, in turn, supported between a pair of trunnions. A front trunnion is located at the front of the table saw and a back trunnion is located at the back of the table saw. The back trunnion which is illustrated in FIG. 13, is generally indicated by the reference numeral 118 and includes a pair of horizontally extending flanges 120. Each flange 120 has an aperture 122 which is vertically aligned with a threaded aperture 124 in the work supporting table 78. A bolt 134 extends through the aperture 122 and is threaded into the aperture 124 to secure the trunnion 118 to the work supporting table 78. Each aperture 124 is wider than the bolt, at least in the lateral dimension, to enable the back trunnion 118 to be moved laterally relative to the work supporting table 78.

Each L-shaped bracket 126 comprises a vertical leg 128 which contains a horizontal threaded aperture 136 and a horizontal leg 130 which contains an aperture 132. If it is determined that realignment of the arbor is required. A center bolt 137 is loosened, the bolt 137 extends freely through an oversize aperture in a flange 139 of the trunnion 118 and is threaded into the supporting table 78. The bolts which hold the back trunnion 118 to the work supporting table 78 are removed and an L-shaped bracket 126 is positioned beneath each of the flanges 120 so that the aperture 132 of each bracket is vertically aligned with the adjacent apertures 122 and 124. A bolt 134 which is slightly longer than the original bolts which held the back trunnion is inserted into the apertures 132 and 122 and is then threaded into the aperture 124, sufficiently to support the cradle 118 but not tight enough to prevent the back trunnion from being shifted laterally. The aperture 122 is substantially larger in diameter, at least in the lateral dimension, than the bolt 134 allow for lateral shifting of the back trunnion 118. Each L-shaped bracket 126 includes an adjusting screw 138 which is threaded into the aperture 136. After it has been determined which direction the back trunnion 118 must be shifted in order to bring the arbor into alignment with the guide groove of the work supporting table, the set screw 138 on the L-shaped bracket 126, from which movement of the cradle 118 must occur to achieve correct alignment of the arbor, is advanced toward the adjacent flange 120 until it engages the end of the flange. The adjusting screw 138 is then advanced an additional amount to shift the trunnion 118 relative to the L-shaped bracket 126 and to the work supporting table 78 until the arbor is at a right angle to the guide groove of the work supporting table. At this point, the adjusting screw 138 of the opposite L-shaped bracket 126 is advanced until it engages the end of the adjacent flange 120. A locking nut 140 is threaded onto each adjusting screw 138 between the head of the screw and the outer surface of the vertical leg portion 128. When the back trunnion 118 has been correctly positioned and each adjusting screw 138 is in engagement with its respective flange 120, the center bolt 137 is tightened. The lock nuts 140 are then advanced toward their respective vertical leg portions 128 so that the set screws 138 will remain in their set position and the trunnion 118 will be prevented from shifting laterally out of adjustment during subsequent operation of the table saw. The bolts 134 are tightened to fully secure the back trunnion 118 to the work supporting table 78.

Figure 16:
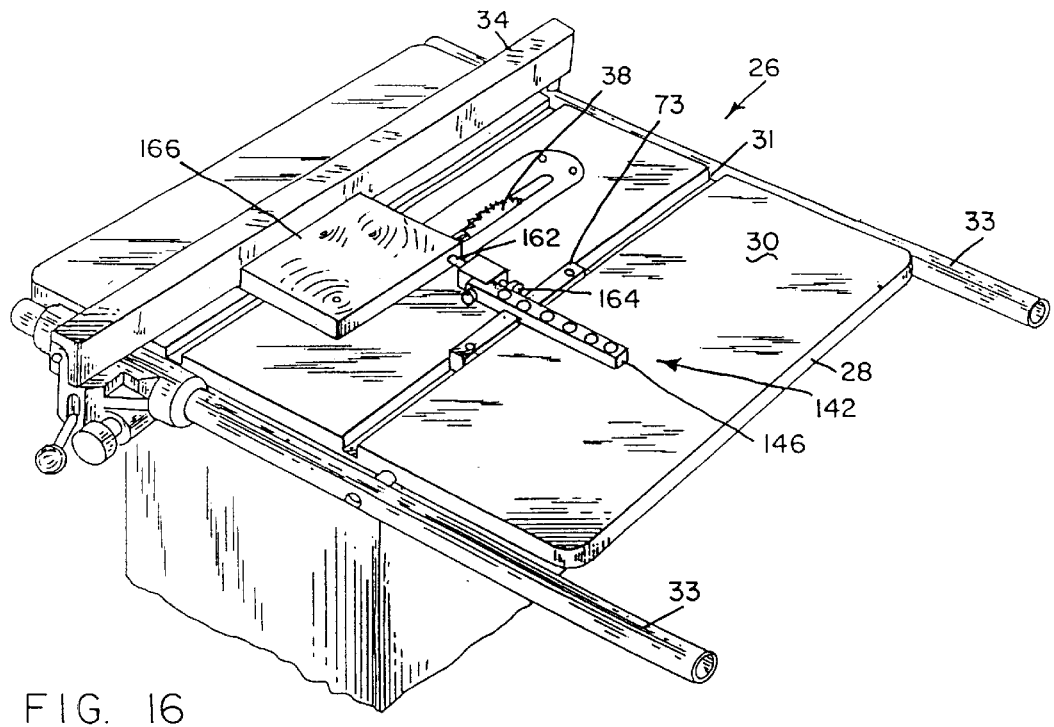
FIG. 16 is a perspective view of a workpiece locating gauge which embodies a self-adjusting accessory principle of the present invention and shown applied to the supporting table of a conventional table saw.
Figure 18:
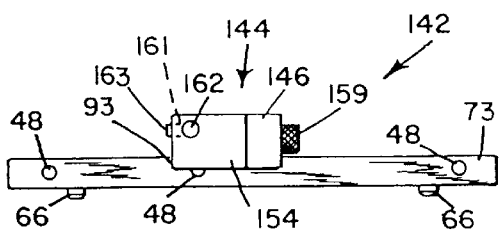
FIG. 18 is an end view of the workpiece locating gauge, looking in the direction of arrow XVIII of FIG. 17.
Figure 17:
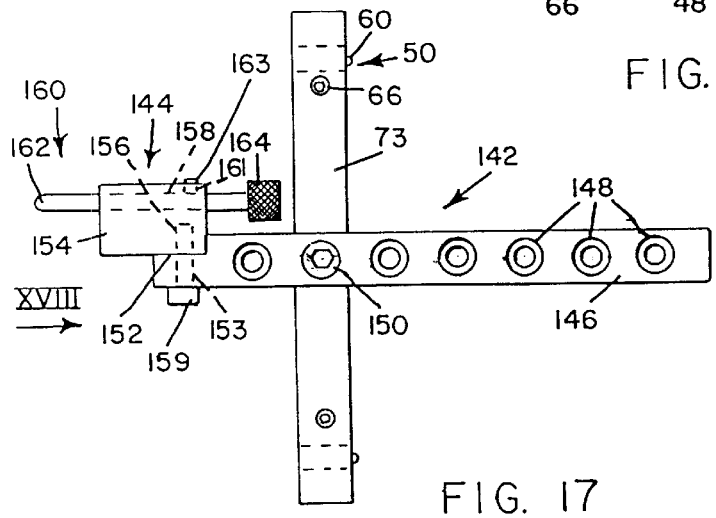
FIG. 17 is a top plan view of the workpiece locating gauge.

Referring to FIGS. 16–18, there is shown a third self-adjusting accessory of the present invention which is generally indicated b y the reference numeral 142. The accessory 142 includes a stop gauge, generally indicated by the reference numeral 144, which is connected to the bar 73 which is utilized with the alignment gauge 72 to form the accessory 70. The stop gauge 144 includes a cross bar 146 which has a plurality of vertical apertures 148 which enable the cross bar 146 to be mounted within the slot 93 of the guide bar 73 at a plurality of positions along the length of the cross bar 146 by means of an allen screw 150. One end of the cross bar 146 has a notch 152 and a horizontal aperture 153 which extends to the notch 152. A generally rectangular block (or housing) 154 is located within the notch 152 and has a horizontal threaded aperture 156 which is horizontally aligned with the aperture 153 of the cross bar 146. A screw 159 is threaded into the aperture 156 for securing the block 154 to the cross bar 146. The block 154 also has a threaded horizontal aperture 158 which is at a right angle to the aperture 153. The threaded shank portion 162 of an adjusting screw or rod, generally indicated by the reference numeral 160, is threaded into the aperture 158. The adjusting screw 160 has a head portion 164 which has a knurled outer surface to enable the adjusting screw to be manually adjusted by axial rotation of the adjusting screw within the threaded aperture 158. Alternatively, the block 154 may include a threaded aperture 161 which intersects threaded aperture or bore 148, and a set screw 163 which is threaded into aperture 161 for releasably locking the screw (or rod) 160 in any adjusted position.

The stop gauge 144 is used as a locating tool for a workpiece to enable narrow strips to be cut from a workpiece, particularly for strips which are to narrow to be safely cut along the ripping fence of the table saw in a traditional manner. If the strips to be cut are too narrow, they are difficult to push through the saw between the cutting blade and the ripping fence.

The stop gauge 144 of the present application is utilized by placing the guide bar 73 in the guide groove 31 in the work supporting table 28 of the table saw 26 so that the free end of the adjusting screw 160 extends toward the cutting blade 38. The screw 160 is adjusted so that the distance between the free end of the adjusting screw and the flat surface of the cutting blade is equal to the width of the strip which is to be cut from the workpiece. In contrast to the other fixtures which are utilized with the elongated guide bar 73, the vertical side surface of the guide bar which is furthest from the cutting blade is maintained snugly against the vertical side surface of the guide groove 31 which is also furthest to the cutting blade, due to the biasing action of the plungers 50. When the free end of the adjusting screw 160 has been adjusted to its desired position, the workpiece, which is generally indicated by the reference numeral 166, is positioned on the upper surface 30 of the work supporting table 28 so that the side edge of the workpiece engages the free end of the adjusting screw 160, as shown in FIG. 16. The ripping fence 34 is then adjusted along the upper surface of the table 28 until it engages the opposite side edge of the workpiece 166. At this point, the ripping fence 34 is locked in position. The workpiece 166 is then pushed through the cutting blade 38, which results in the cutting of a strip from the workpiece of a desired width. If another piece having the same width as the first piece is to be cut from the workpiece, the workpiece is repositioned against the free end of the adjusting screw 160. The fence 34 is readjusted to engage the opposite side edge of the workpiece and is secured in this position as before. The workpiece 166 is advanced through the cutting blade 38 to produce a second narrow strip which is identical to the first strip. This procedure can be repeated to produce as many identical narrow strips as desired. The self-adjusting accessory 142, which employs the stop gauge 144, can be utilized with a cross cut fixture for cutting a plurality of pieces of the same length from a long workpiece. The stop gauge 144 is positioned so that the free end of the adjusting screw 160 is positioned from the cutting blade 38 at a distance which is equal to the length of the pieces to be cut. A long workpiece is positioned on the work supporting table so that the end of the workpiece engages the end of the adjusting screw 160. The workpiece is then advanced through the saw 38. Subsequent equal length pieces can be cut from the workpiece by repeating this procedure.

The cross bar 146 of the accessory 142 is nearly identical to the cross bar 74 of the accessory 72 so that the stop gauge 144 and the alignment gauge 72 can be used interchangeably with either cross bar.

Clearly, minor changes may be made in the form and construction of this invention and in the embodiments of the process without departing from the material spirit of either. Therefore, it is not desired to confine the invention to the exact forms shown herein and described but it is desired to include all subject matter that properly comes within the scope claimed.

The invention having been thus described, what is claimed as new and desired to secure by letters patent is:

1. Verification apparatus for checking the accuracy and alignment of the arbor and cutting blade of a table saw relative to the guide groove in the work supporting table of a table saw which extends transversely of the longitudinal axis of the arbor, wherein said guide groove has a bottom surface and a pair of opposed side surfaces and said arbor has a free end and a stop which is spaced from said free end, said apparatus comprising:
    (a) a reference plate which has a flat reference surface and an aperture for enabling the reference plate to be mounted on the arbor of a table saw, said reference surface having markings at predetermined angular intervals relative to the aperture of the reference plate;
    (b) a cap having a bore for enabling the cap to be mounted on the free end of an arbor of a table saw, said cap having visual indicator means located at predetermined angular intervals relative to the arbor;
    (c) locking means for removably fixing said cap to the free end of the arbor;
    (d) a compression spring for mounting on the arbor between said cap and said reference plate for biasing the reference plate against a stop on the arbor of a table saw; and
    (e) an alignment gauge apparatus comprising:
        (1) an elongated guide bar for slidable mounting in the groove of a table saw, said guide bar having a generally rectangular cross section which includes a bottom surface, a first vertical side surface and a second vertical side surface which is opposite said first vertical side surface;
        (2) a cross bar which is mounted on said guide bar so that said cross bar extends substantially transversely of said guide bar; and
        (3) a dial gauge which is mounted on one end of said cross bar, said dial gauge having a housing which contains a dial face, a dial and a feeler rod which is operatively connected to said dial, and which is slidably mounted on said housing for movement longitudinally of said cross bar, said feeler rod having a free end which extends beyond the end of said cross bar to which said dial gauge is attached.

2. Verification apparatus as recited in claim 1, wherein said elongated guide bar further comprises at least two yieldable compensators which protrude from the first vertical side surface for engaging one of the side surfaces of the guide groove of a saw table to maintain the second vertical side surface snugly against the other of the side surfaces of the guide groove.

3. Verification apparatus as recited in claim 1, wherein said cross bar is adjustably mounted on said guide bar for occupying a plurality of positions along the longitudinal axis of the cross bar and said alignment gauge apparatus further comprises backing means for fixing said cross bar in any one of said plurality of positions.

4. Verification apparatus as recited in claim 1, wherein said cap has a regular polygonal outer surface which extends about the longitudinal axis of said arbor, said regular polygonal outer surface representing said indicator means.

5. Verification apparatus as recited in claim 1, wherein said cap has at least one threaded aperture which extends into the bore of said cap and said locking means is a set screw which is threaded into said aperture.

6. An adapter for aligning the cutting blade supporting arbor of a table saw which has a work supporting table, a front trunnion which is located beneath the front end of the work supporting table, a rear trunnion which is located beneath the back end of the work supporting table, and a cradle which is supported between the front and back trunnions, each of said trunnions having first and second flanges which extend laterally from opposite ends of the trunnion, said first flange having a vertical end surface which faces said guide groove and a bottom surface, said second flange having a vertical end surface which faces away from said guide groove and a bottom surface, each of said flanges having a vertical aperture which extends completely through the flange and is vertically aligned with a threaded vertical aperture in the bottom side of the work supporting table for receiving a bolt which extends through the vertical aperture in the adjacent flange for securing the trunnions to the work supporting table, the aperture in each of the flanges of at least one of said trunnions being larger than the bolt, at least in the lateral dimension, said adapter being applicable to one of the trunnions upon removal of the bolts which support said one trunnion, said adapter comprising:
    (a) a first L-shaped bracket having a horizontal leg portion which has a vertical hole and a vertical leg portion which has a threaded horizontal hole that extends completely through the vertical leg portion, said horizontal leg portion being adapted to be is positioned against the bottom surface of the first flange so that the vertical hole is vertically aligned with the vertical aperture of the first flange for enabling a bolt to be threaded into the threaded aperture of the work supporting table to secure the first L-shaped bracket and the first flange to the work supporting table;
    (b) a second L-shaped bracket which is identical to said first L-shaped bracket, the horizontal leg portion of the second L-shaped bracket being adapted to be positioned against the bottom surface of the second flange so that the vertical hole of the second flange is vertically aligned with the vertical aperture of the second flange for enabling a bolt to be threaded into the threaded aperture of the work supporting table to secure the second L-shaped bracket and the second flange to the work supporting table;
    (c) a first adjusting screw which extends completely through the horizontal hole in the vertical leg portion of said first L-shaped bracket for axial movement toward and away from the vertical end surface of the first flange when the first L-shaped bracket is applied to the first flange so that axial movement of said first adjusting screw toward the first flange causes the trunnion to, move laterally toward the second L-shaped bracket; and
    (d) a second adjusting screw which extends completely through the horizontal hole in the vertical leg portion of said second L-shaped bracket for axial movement toward and a way from the vertical end surface of the second flange when the second L-shaped bracket is applied to the second flange so that axial movement of said first adjusting screw against the vertical end surface of the second flange causes the trunnion to move laterally toward the first L-shaped bracket so that the trunnion can be selectively moved laterally toward and a way from the guide groove.

7. An adapter for aligning the cutting blade supporting arbor of a table saw which has a work supporting table, a front trunnion which is located beneath the front end of the work supporting table, a rear trunnion which is located beneath the back end of the work supporting table, and a cradle which is supported between the front and back trunnions, each of said trunnions having first and second flanges which extend laterally from opposite ends of the trunnion, said first flange having a vertical end surface which faces said guide groove and a bottom surface, said second flange having a vertical end surface which faces away from said guide groove and a bottom surface, each of said flanges having a vertical aperture which extends completely through the flange and is vertically aligned with a threaded vertical aperture in the bottom side of the work supporting table for receiving a bolt which extends through the vertical aperture in the adjacent flange for securing the trunnions to the work supporting table, the aperture in each of the flanges of at least one of said trunnions being larger than the bolt, at least in the lateral dimension, said adapter being applicable to one of the trunnions upon removal of one of said bolts and the loosening of the other of said bolts which support said one trunnion, said adapter comprising:

(a) an L-shaped bracket having a horizontal leg portion which has a vertical hole and a vertical leg portion which has a threaded horizontal hole which extends completely through the vertical leg portion said horizontal leg portion being adapted to be positioned against the bottom surface of either one of the trunnion flanges from which a bolt has been removed so that the vertical hole is vertically aligned with the vertical aperture of said one trunnion flange;

(b) a bolt for threading into the threaded aperture of the work supporting table to secure the L-shaped bracket and the trunnion flange to the work supporting table; and (c) an adjusting screw which extends completely through the horizontal hole in said vertical leg portion for axial movement toward and away from the vertical end surface of said one trunnion flange when the L-shaped bracket is applied to said one trunnion flange so that movement of said adjusting screw against the vertical end surface of said one trunnion flange the causes the trunnion to move laterally away from the L-shaped bracket so that the trunnion can be selectively moved laterally toward and away from the guide groove.

8. A method of aligning the cutting blade supporting arbor of a table saw which has a work supporting table, a front trunnion which is located beneath the front end of the work supporting table, a rear trunnion which is located beneath the back end of the work supporting table, and a cradle which is supported between the front and back trunnions, each of said trunnions having first and second flanges which extend laterally from opposite ends of the trunnion, said first flange having a vertical end surface which faces said guide groove and a bottom surface, said second flange having a vertical end surface which faces away from said guide groove and a bottom surface, each of said flanges having a vertical aperture which extends completely through the flange and is vertically aligned with a threaded vertical aperture in the bottom side of the work supporting table for receiving a bolt which extends through the vertical aperture in the adjacent flange for securing the trunnions to the work supporting table, the aperture in each of the flanges of at least the back trunnion being larger than the bolt, at least in the lateral dimension, said method comprising the following steps:

(a) determining, with the use of an alignment gauge, the direction in which one of the back trunnion must be moved relative to the guide groove in order to render the arbor at a right angle to the guide groove;

(b) loosening the bolt in the flange of the back trunnion toward which the back trunnion must be moved in order to render the arbor at a right angle to the guide groove;

(c) removing the bolt from the other flange of the back trunnion;

(d) providing an L-shaped bracket having a horizontal leg portion which has a vertical hole and a vertical leg portion which has a threaded horizontal hole which extends completely through the vertical leg portion;

(e) positioning the horizontal leg portion of the L-shaped bracket against the bottom surface of the flange of the back trunnion from which a bolt has been removed so that the vertical hole is vertically aligned with the vertical aperture of the flange to which the bracket has been applied;

(f) inserting a bolt through the vertical hole in the leg portion of the L-shaped bracket and the vertical aperture of the adjacent flange and threading the bolt into the threaded aperture of the work supporting table sufficiently to support the L-shaped bracket and the trunnion flange to the work supporting table and to enable the back trunnion to be moved laterally;

(g) threading an adjusting screw into the horizontal hole in the vertical leg portion of the L-shaped bracket and advancing the adjusting screw until it engages the vertical end surface of the adjacent flange and moves the back trunnion a distance which aligns the arbor at a right angle to the guide groove of the work supporting table; and (h) tightening the bolts in both flanges of the back trunnion.

9. A method of aligning the cutting blade supporting arbor of a table saw as recited in claim 8, further comprising the following steps:

(a) prior to step (g) of claim 8, removing the bolt in the flange of the back trunnion toward which back trunnion is moved;

(b) positioning the horizontal leg portion of a second L-shaped bracket such as that which is described in step (d) of claim 8 against the bottom surface of the trunnion flange toward which the back trunnion is to be moved so that the vertical hole of said second L-shaped bracket is vertically aligned with the vertical aperture of the flange of the back trunnion with which the second L-shaped bracket is engaged;

(c) inserting a bolt through the vertical hole in the leg portion of the second L-shaped bracket and the vertical aperture of the adjacent flange and threading the bolt into the threaded aperture of the work supporting table sufficiently to support the second L-shaped bracket and the adjacent trunnion flange to the work supporting table and to allow the back trunnion to be moved laterally;

(d) threading a second adjusting screw into the horizontal hole in the vertical leg portion of the second L-shaped bracket;

(e) advancing the second adjusting screw toward the vertical end surface of the adjacent flange until the second adjusting screw engages the end surface of the adjacent flange after the back trunnion has been moved so that the arbor is at a right angle to the guide groove in the work supporting table; and (f) tightening the bolts in both flanges of the back trunnions.

* * * * *